United States Patent
Dillon, IV (10) Patent No.: US 6,256,994 B1
(45) Date of Patent: *Jul. 10, 2001

(54) OPERATION OF AN AIR SEPARATION PROCESS WITH A COMBUSTION ENGINE FOR THE PRODUCTION OF ATMOSPHERIC GAS PRODUCTS AND ELECTRIC POWER

(75) Inventor: John Lloyd Dillon, IV, Kutztown, PA (US)

(73) Assignee: Air Products and Chemicals, Inc., Allentown, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,153

(22) Filed: Jun. 4, 1999

(51) Int. Cl.[7] .................................................. F01K 25/06
(52) U.S. Cl. .............................. 60/649; 60/651; 60/671; 60/682
(58) Field of Search ........................... 60/649, 651, 653, 60/671, 682, 39.182

(56) References Cited

U.S. PATENT DOCUMENTS

| | | | |
|---|---|---|---|
| 3,731,495 | 5/1973 | Cuneney | 62/39 |
| 3,868,817 | * 3/1975 | Marion et al. | 60/39.02 |
| 3,950,957 | 4/1976 | Zakon | 62/30 |
| 4,019,314 | 4/1977 | Springmann | 60/39.02 |
| 4,224,045 | 9/1980 | Olszewski et al. | 62/30 |
| 4,250,704 | 2/1981 | Bruckner et al. | 60/39.12 |
| 4,275,562 | * 6/1981 | Fejer | 60/682 X |
| 4,631,915 | 12/1986 | Frewer et al. | 60/39.12 |
| 4,697,415 | 10/1987 | Schiffers | 60/39.12 |
| 4,707,994 | 11/1987 | Shenoy et al. | 62/11 |
| 4,729,217 | 3/1988 | Kehihofer | 60/39.02 |
| 4,785,621 | 11/1988 | Alderson et al. | 60/39.12 |

(List continued on next page.)

FOREIGN PATENT DOCUMENTS

| | | |
|---|---|---|
| 19529681 | 2/1997 | (DE) . |
| 0503900 | 9/1992 | (EP) . |
| 845644A2 | 6/1998 | (EP) . |
| 1455960 | 11/1996 | (GB) . |

OTHER PUBLICATIONS

U.S. application No. 08/996,556, Smith et al., filed Dec. 23, 1997.

(List continued on next page.)

*Primary Examiner*—Hoang Nguyen
(74) *Attorney, Agent, or Firm*—John M. Fernbacher (57) ABSTRACT

The generation of electric power and the separation of a feed gas mixture containing oxygen and nitrogen are carried out by combusting an oxidant gas and fuel in a combustion engine to generate shaft work and a hot exhaust gas, utilizing the shaft work to drive an electric generator to provide the electric power, compressing the feed gas mixture and separating the resulting compressed feed gas mixture into two or more product gas streams with differing compositions, heating one of the product gas streams by indirect heat exchange with the hot exhaust gas, and work expanding the resulting heated product gas stream to generate shaft work and yield an expanded product gas stream. The feed gas mixture can be air and the combustion engine can be a gas turbine combustion engine, and the air separation process preferably is operated independently of the gas turbine combustion engine.

17 Claims, 4 Drawing Sheets

U.S. PATENT DOCUMENTS

| | | | |
|---|---|---|---|
| 4,962,646 | | 10/1990 | Rathbone .................................. 62/24 |
| 5,040,370 | | 8/1991 | Rathbone ............................... 60/648 |
| 5,076,837 | | 12/1991 | Rathbone et al. ...................... 75/433 |
| 5,081,845 | | 1/1992 | Allam et al. ............................. 62/24 |
| 5,251,450 | | 10/1993 | Agrawal et al. ......................... 62/25 |
| 5,251,451 | | 10/1993 | Xu et al. .................................. 62/25 |
| 5,257,504 | | 11/1993 | Agrawal et al. ......................... 62/24 |
| 5,317,862 | | 6/1994 | Rathbone ............................ 60/39.05 |
| 5,388,395 | | 2/1995 | Scharpf et al. ..................... 60/39.02 |
| 5,406,786 | | 4/1995 | Scharpf et al. ..................... 60/39.05 |
| 5,410,869 | | 5/1995 | Muller ................................ 60/39.02 |
| 5,421,166 | | 6/1995 | Allam et al. ............................. 62/24 |
| 5,437,150 | | 8/1995 | Latham et al. ...................... 60/39.02 |
| 5,459,994 | | 10/1995 | Drnevich ............................ 60/39.02 |
| 5,666,823 | | 9/1997 | Smith et al. ........................... 62/646 |
| 5,687,570 | * | 11/1997 | Bronicki et al. .................. 60/682 X |
| 5,722,259 | | 3/1998 | Sorensen et al. ...................... 62/646 |
| 5,740,673 | | 4/1998 | Smith et al. ........................ 60/39.02 |

OTHER PUBLICATIONS

Allam, R.J. et al., "Future Direction of Air Separation Design for Gasification, IGCC and Alternative Fuel Projects", *Gasification–The Gateway to a Cleaner Future*, Ichem Conference, Sep. 23–24, 1998, Dresden Germany.

Smith, A. R., et al., "Next–Generation Integration Concepts for Air Separation Units and Gas Turbines", *Journal of Engineering for Gas Turbines and Power*, Apr. 1997, vol. 119, pp 298–304.

Smith, A. R., et al., "Integration of Oxygen Plants and Gas Turbines in IGCC Facilities", Presented at the *American Power Conference* $58^{th}$ Annual Meeting, Apr. 9–11, 1996, Chicago, IL.

U.S. application No. 09/083219, Smith et al., filed May 22, 1998.

* cited by examiner

OPERATION OF AN AIR SEPARATION PROCESS WITH A COMBUSTION ENGINE FOR THE PRODUCTION OF ATMOSPHERIC GAS PRODUCTS AND ELECTRIC POWER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Combustion engines can be integrated with air separation processes in highly efficient systems for the generation of electric power and the production of atmospheric gas products. A wide variety of fuels can be used in these combustion engines, including natural gas, fuel gas generated by the gasification of liquid or solid carbonaceous materials, and liquid hydrocarbons. Fuel gas generated by gasification typically uses oxygen from the air separation process.

Gas turbine combustion engines, or gas turbines, can be used to drive electric generators in combined cycle generation systems in which the expansion turbine exhaust is used to generate steam which is expanded in a bottoming cycle steam turbine which drives another electric generator. In the production of oxygen and/or nitrogen, the pressurized air feed for the air separation process can be provided partly or completely by the gas turbine compressor, and nitrogen from the air separation process can be introduced into the gas turbine combustor for additional energy recovery and control of $NO_x$ formation.

Comprehensive reviews of integration methods for gas turbines and air separation units are given in a paper entitled "Next-Generation Integration Concepts for Air Separation Systems and Gas Turbines" by A. R. Smith et al in *Transactions of the ASME*, Vol. 119, April 1997, pp. 298–304 and in a presentation entitled "Future Direction of Air Separation Design for Gasification, IGCC, and Alternative Fuel Projects" by R. J. Allam et al, IChem$^E$ Conference on Gasification, Sep. 23–24 1998, Dresden, Germany.

A common mode of integration between the gas turbine and air separation systems is defined as full air and nitrogen integration. In this operating mode, all air for the gas turbine combustor and the air separation unit is provided by the gas turbine air compressor which is driven by the expansion turbine, and nitrogen from the air separation unit is utilized in the integrated system. Full air and nitrogen integration is described in representative U.S. Pat. Nos. 3,731,495, 4,224, 045, 4,250,704, 4,631,915, and 5,406,786, wherein the nitrogen is introduced into the gas turbine combustor. Full air and nitrogen integration also is described in U.S. Pat. Nos. 4,019,314 and 5,317,862, and in German Patent Publication DE 195 29 681 A1, wherein the nitrogen is work expanded to provide work of compression for the air feed or to generate electric power.

The gas turbine and air separation processes can operate in an alternative mode, defined as partial air integration with full nitrogen integration, in which a portion of the air feed for the air separation unit is provided by the gas turbine compressor and the remainder is provided by a separate air compressor driver with an independent power source. Nitrogen from the air separation unit is introduced into the gas turbine combustor or is otherwise work expanded. This operating mode is described in representative U.S. Pat. Nos. 4,697,415; 4,707,994; 4,785,621; 4,962,646; 5,437,150; 5,666,823; and 5,740,673.

In another alternative, nitrogen integration is used without air integration. In this alternative, the gas turbine and air separation systems each has an independently-driven air compressor, and the nitrogen from the air separation unit is returned to the gas turbine combustor. This option is described in representative U.S. Pat. Nos. 4,729,217; 5,081, 845; 5,410,869; 5,421,166; 5,459,994; and 5,722,259.

U.S. Pat. No. 3,950,957 and Great Britain Patent Specification 1 455 960 describe an air separation unit integrated with a steam generation system in which a nitrogen-enriched waste stream is heated by indirect heat exchange with hot compressed air from the air separation unit feed air compressor, the heated nitrogen-enriched stream is further heated indirectly in a fired heater, and the final hot nitrogen-enriched stream is work expanded in a dedicated nitrogen expansion turbine. The work generated by this expansion turbine drives the air separation unit main air compressor. The nitrogen expansion turbine exhaust and the combustion gases from the fired heater are introduced separately into a fired steam generator to raise steam, a portion of which may be expanded in a steam turbine to drive the air separation unit feed air compressor. Optionally, the combustion gases from the fired heater are expanded in a turbine which drives a compressor to provide combustion air to a separate fired heater which heats the nitrogen-enriched stream prior to expansion.

An alternative use for high pressure nitrogen from an air separation unit integrated with a gas turbine is disclosed in U.S. Pat. No. 5,388,395 wherein the nitrogen is work expanded to operate an electric generator. The cold nitrogen exhaust from the expander is mixed with the inlet air to the gas turbine compressor thereby cooling the total compressor inlet stream. Alternatively, low pressure nitrogen from the air separation unit is chilled and saturated with water in a direct contact cooler-chiller, and the chilled, saturated nitrogen is mixed with the inlet air to the gas turbine compressor.

U.S. Pat. Nos. 5,040,370 and 5,076,837 disclose the integration of an air separation unit with high-temperature processes which uses oxygen, wherein waste heat from the process is used to heat pressurized nitrogen from the air separation unit, and the hot nitrogen is work expanded to generate electric power.

European Patent Publication EP 0 845 644 A2 describes an elevated pressure air separation unit in which the pressurized nitrogen-enriched product is heated indirectly by the combustion of low pressure fuel in a fired heater, and the hot nitrogen is expanded to produce power or drive gas compressors within the air separation unit.

In the production of oxygen in areas with limited or no accessibility to electric power grids, feed air compression for an air separation unit can be provided by combustion engines if sufficient fuel is available. In industrial operations which require atmospheric gas products such as oxygen, nitrogen, and argon, electric power often is required onsite to drive various types of rotating equipment. When imported electric power is limited, a self-contained process utilizing combustion engine drivers is required to generate the gas products and electric power. The invention disclosed below and defined by the claims which follow addresses this need by providing methods to generate atmospheric gas products and electric power in integrated air separation/combustion engine systems which use alternative methods of recovering and utilizing the heat in the combustion engine exhaust gas stream.

BRIEF SUMMARY OF THE INVENTION

The invention is a method for the generation of electric power and the separation of a feed gas mixture containing oxygen and nitrogen which comprises:

(a) combusting an oxidant gas and fuel in a combustion engine to generate shaft work and a hot exhaust gas;

(b) utilizing the shaft work of (a) to drive an electric generator to provide the electric power;

(c) compressing the feed gas mixture and separating the resulting compressed feed gas mixture into two or more product gas streams with differing compositions, and (d) heating at least one of the product gas streams by indirect heat exchange with at least a portion of the hot exhaust gas from the combustion engine of (a) and work expanding the resulting heated product gas stream to generate shaft work and yield an expanded product gas stream. Typically, the combustion engine is a gas turbine combustion engine; alternatively, an internal combustion engine may be employed. The shaft work obtained by work expanding the resulting heated product gas stream may be utilized to generate additional electric power.

The feed gas mixture typically is air, one of the product gas streams is an oxygen-enriched product gas stream, and another of the product gas streams is a nitrogen-enriched product gas stream. One of the product gas streams can be an argon-enriched stream.

The air can be separated by compressing and cooling air to yield a pressurized air feed stream, purifying the pressurized air feed stream by removing water and carbon dioxide therefrom, further cooling the resulting purified air feed stream, and separating the resulting cooled purified air feed stream by cryogenic distillation to yield the oxygen-enriched product gas stream and the nitrogen-enriched product gas stream. Any other known air separation method can be used as alternative to cryogenic distillation.

The nitrogen-enriched product gas stream can be heated by indirect heat exchange with the hot exhaust gas from the combustion engine and the resulting heated nitrogen-enriched product gas stream is work expanded to generate shaft work and yield an expanded nitrogen-enriched product gas stream. At least a portion of the shaft work obtained by work expanding the resulting heated nitrogen-enriched product gas stream can be utilized to compress the oxygen-enriched product gas stream. The expanded nitrogen-enriched product gas stream can be cooled by indirect heat exchange with a process gas stream to yield a heated process gas stream.

Air separation can be effected by compressing and cooling air to yield a pressurized air feed stream, purifying the pressurized air feed stream by a cyclic thermal swing adsorption process to remove water and carbon dioxide therefrom, further cooling the resulting purified air feed stream, and separating the resulting cooled purified air feed stream by cryogenic distillation to yield the oxygen-enriched product gas stream and the nitrogen-enriched product gas stream, wherein the heated process gas stream is used as a regeneration gas in the cyclic thermal swing adsorption process.

The nitrogen-enriched product gas stream preferably is heated by indirect heat exchange with the hot exhaust gas from the combustion engine in a heat exchanger, and this heating can be supplemented by combining the expanded nitrogen-enriched product gas stream with the hot exhaust gas at an intermediate point in the heat exchanger. In this case, a combined stream of expanded nitrogen-enriched product gas and cooled exhaust gas is withdrawn from the heat exchanger and can be further cooled by indirect heat exchange with a process gas to yield a heated process gas stream.

The invention can further comprise reheating the expanded product gas stream by indirect heat exchange with the hot exhaust gas from the combustion engine and work expanding the resulting reheated gas to yield shaft work and a final reduced pressure product gas. The combined shaft work of this step and the shaft work obtained by work expanding the resulting heated product gas stream can be utilized to generate additional electric power.

The compression of the feed gas mixture preferably is carried out in an independently-driven a feed gas compressor.

The nitrogen-enriched product gas stream can be heated by indirect heat exchange with the hot exhaust gas in a heat exchanger, the resulting cooled exhaust gas is combined with the expanded nitrogen-enriched product gas stream, and the resulting combined gas stream further cooled by indirect heat exchange with a process gas to yield a heated process gas stream.

DETAILED DESCRIPTION OF THE INVENTION

The temperature of the exhaust stream from a combustion engine such as a gas turbine can range up to 1600° F., and the heat in this stream represents a significant portion of the total heat generated by the combustion of fuel in the engine. When a combustion engine is integrated with an air separation unit, the overall energy efficiency of the system can be improved according to the present invention by recovering heat from the combustion engine exhaust by a dedicated heat exchange system integrated with the air separation unit. A pressurized effluent stream, typically a dry nitrogen-enriched stream from the air separation unit, is heated by the combustion engine exhaust, and the resulting hot gas is expanded to produce shaft work which can be used to drive other process rotating machinery or to generate electric power.

Figure 1:
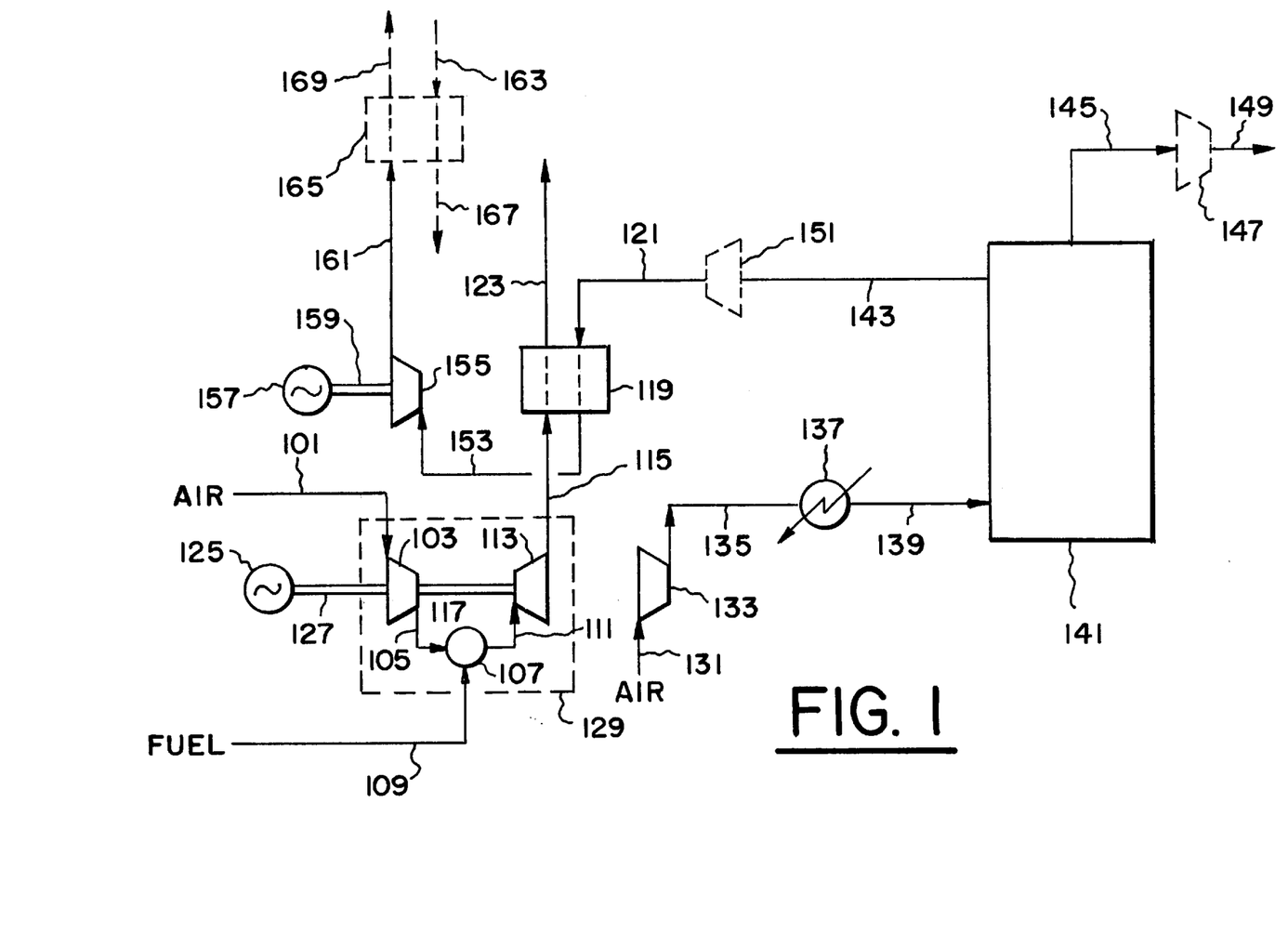
FIG. 1 is a schematic flow diagram of the base embodiment of the process of the present invention.

A first embodiment of the invention is illustrated in FIG. 1. Oxygen-containing oxidant gas stream 101, which can be any oxygen-containing gas which can support combustion and typically is atmospheric air, is introduced into combustion engine 129. In this and the following embodiments of the invention, combustion engine 129 is a gas turbine engine, but other types of combustion engines can be used as described later. Air stream 101 is compressed in compressor 103 to 48–590 psia and 160–1500° F. Compressed air stream 105 is combusted in combustor 107 with fuel stream 109 to produce hot pressurized combustion gas stream 111. Typically the fuel stream 109 is natural gas, but any gaseous or liquid fuel can be used.

Hot pressurized combustion gas stream 111 is expanded in expansion turbine 113 to produce shaft work and exhaust stream 115 at near atmospheric pressure and 200 to 1600° F. This expansion step can be defined as work expansion. A portion of the shaft work generated by expansion turbine 113 drives gas turbine compressor 103 by shaft 117. Exhaust stream 115 is cooled in heat exchanger 119 by indirect heat exchange with pressurized gas stream 121 (later defined), and the resulting cooled exhaust stream 123 is vented to the atmosphere. Additional work generated by expansion turbine 113 drives electric generator 125 by shaft 127.

The gas turbine engine described above, often described generically in the art as a gas turbine, is a single-shaft gas turbine engine which utilizes gas turbine compressor 103, combustor 107, expansion turbine 113, and shaft 117. Other types of gas turbine combustion engines known in the art can be utilized in the present invention, for example such as two-shaft or multiple-spool gas turbine systems.

A gas turbine combustion engine is a combustion engine wherein the combustion zone (combustor 107) is separate and distinct from the expansion device (expansion turbine 113) and operates in an open Brayton cycle. Combustion engine 129 alternatively can be an internal combustion engine utilizing an Otto cycle, a Diesel cycle, or any other type of cycle in which the combustion and expansion steps occur in the same device.

Feed gas 131, which is an oxygen-containing gas mixture, typically atmospheric air, is compressed in compressor 133 to a pressure in the range of 48–590 psia. In this embodiment, compressor 133 typically is an intercooled multiple-stage compressor, and in all embodiments is driven by a separate electric motor or other driver (not shown) which is independent of combustion engine 129. Compressed air stream 135 is further cooled in aftercooler 137, and final air feed stream 139 flows into air separation unit 141. Within air separation unit 135, the air feed stream is treated in a contaminant removal system to remove water, carbon dioxide, and other impurities before the feed air is separated in the air separation process.

The resulting purified air feed stream is separated in air separation unit 141, typically using a cryogenic air separation process, whereby the feed air is separated into nitrogen-enriched product stream 143 and oxygen-enriched product stream 145. Optionally, an argon-enriched stream also may be produced. The term "oxygen-enriched" as used herein refers to any gas stream having a higher oxygen concentration than air and the term "nitrogen-enriched" as used herein refers to any gas stream having a higher nitrogen concentration than air. When the feed stream is a gas mixture containing oxygen and nitrogen but is not air, the term "oxygen-enriched" as used herein refers to any gas stream having a higher oxygen concentration than the feed stream and the term "nitrogen-enriched" as used herein refers to any gas stream having a higher nitrogen concentration than the feed stream. Nitrogen-enriched product stream 143 typically contains 80 to 99.999 mole % nitrogen and typically is at near ambient temperature and a pressure of slightly above atmospheric to 590 psia. Oxygen-enriched product stream 145 typically contains 50 to 99.9 mole % oxygen and usually is at near ambient temperature and a pressure of atmospheric to 2000 psia. The oxygen-enriched product can be further compressed if necessary in oxygen product compressor 147 to provide final oxygen product 149 at delivery pressure.

Typically streams 143 and 145 are nitrogen-enriched and oxygen-enriched, respectively, as described above, and are essentially dry. Alternatively, for certain product requirements, stream 145 can be a nitrogen-enriched product stream and stream 143 can be an oxygen-enriched stream.

Air separation unit 141 can be an elevated pressure (EP) cryogenic air separation process in which feed air at a pressure above about 100 psia is separated into oxygen-enriched and nitrogen-enriched streams at pressures above atmospheric. An argon-enriched stream also may be produced if desired, wherein the argon-enriched stream has an argon concentration greater than that of air. In this well-known method, the purified pressurized air feed is further cooled, at least partially condensed, and distilled in one or more distillation columns. Nitrogen-enriched product 143 typically is produced at a pressure in the range of slightly above atmospheric to 590 psia, and refrigeration for the process typically is provided by work expansion of one or more of the internal process streams. Nitrogen-enriched or oxygen-enriched liquid streams may be pumped and vaporized within the process to provide high-pressure gas products. Representative EP air separation units are described in U.S. Pat. Nos. 5,740,673, 5,666,823, and 5,421,166.

Alternatively, air separation unit 141 can utilize any low pressure cryogenic air separation process known in the art in which a portion of the feed air is separated into oxygen-enriched and nitrogen-enriched streams at pressures above atmospheric. In this case, nitrogen-enriched product stream 143 is delivered at a pressure in the range of slightly above atmospheric to 100 psia.

In either of the air separation processes described above, nitrogen-enriched product stream 143 can be compressed if required in compressor 151 to provide pressurized nitrogen stream 121 in the pressure range of about 30 to 1,000 psia. Pressurized nitrogen stream 121 is heated against exhaust stream 115 in heat exchanger 119, and the resulting hot, pressurized nitrogen stream 153 is work expanded to a pressure slightly above atmospheric in expansion turbine 155 to produce shaft work. This shaft work can be utilized to drive electric generator 157 by shaft 159. Alternatively, shaft work produced by expansion turbine 155 can be used to drive other rotating machinery within the process, such as oxygen compressor 147 earlier described. If nitrogen compressor 151 is required, a portion of the work to drive this compressor can be provided by the shaft work generated by expansion turbine 155.

Figure 2:
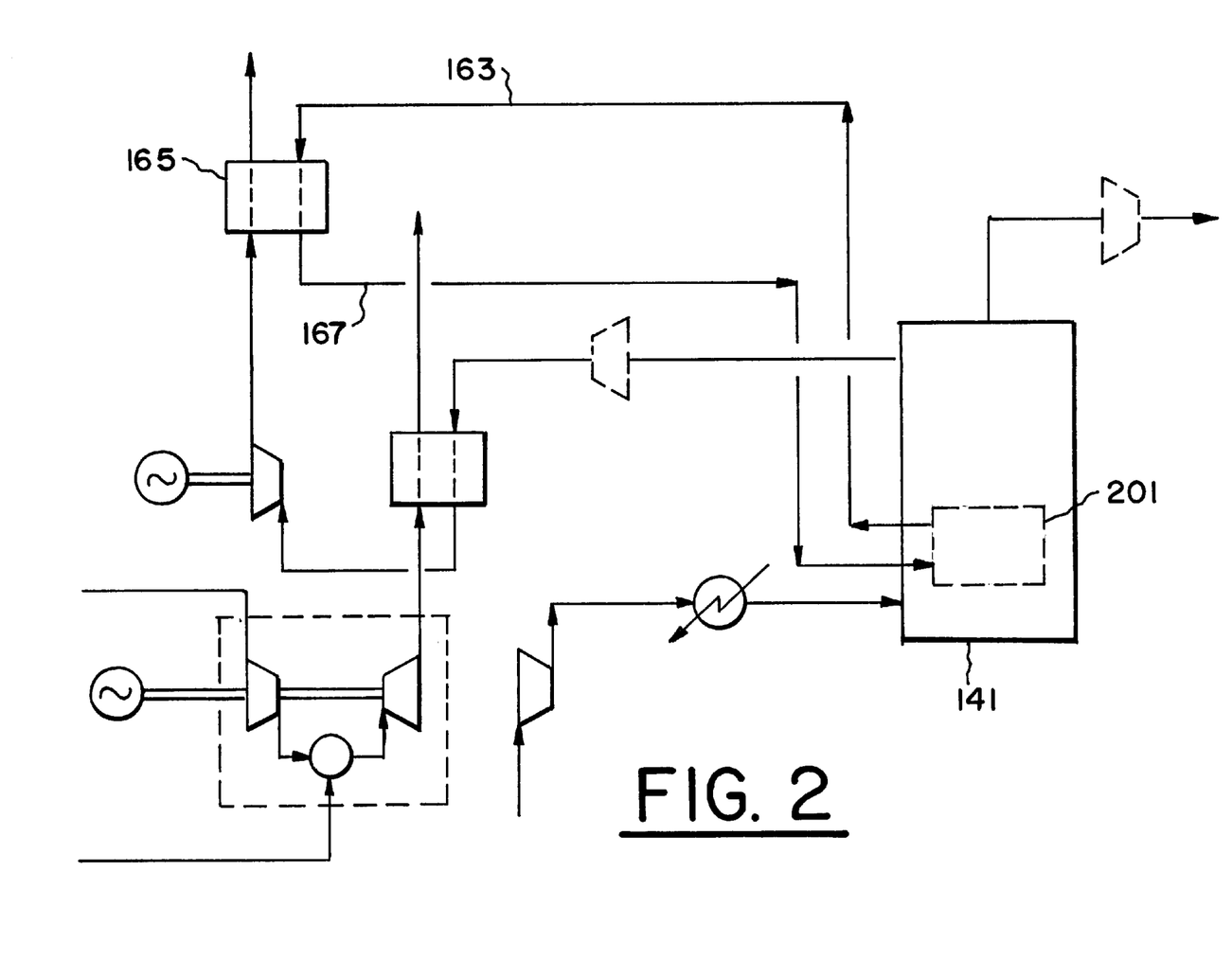
FIG. 2 is a schematic flow diagram of a second embodiment of the process of the present invention wherein additional heat is recovered from the work expanded nitrogen-enriched stream to heat a process stream used in the air separation process.

Expanded nitrogen stream 161 can be discharged to the atmosphere or used elsewhere if desired, for example to heat process gas stream 163 by indirect heat exchange in heat exchanger 165 to yield heated process gas stream 167. Final cooled low pressure nitrogen stream 169 can be discharged to the atmosphere or used as a low pressure product elsewhere if desired. FIG. 2 illustrates one possible use for heated process gas stream 167 from heat exchanger 165. In air separation unit 141, pressurized air feed is treated to remove water, carbon dioxide, and other impurities in thermal swing adsorption (TSA) system 201 before the feed air is separated in the air separation process. The TSA system requires hot, dry regeneration gas to regenerate the adsorbent beds, and this is provided by heated gas stream 167. Cool gas is supplied to heat exchanger 165 as stream 163 from TSA system 201 or as another process stream within air separation unit 141.

Figure 3:
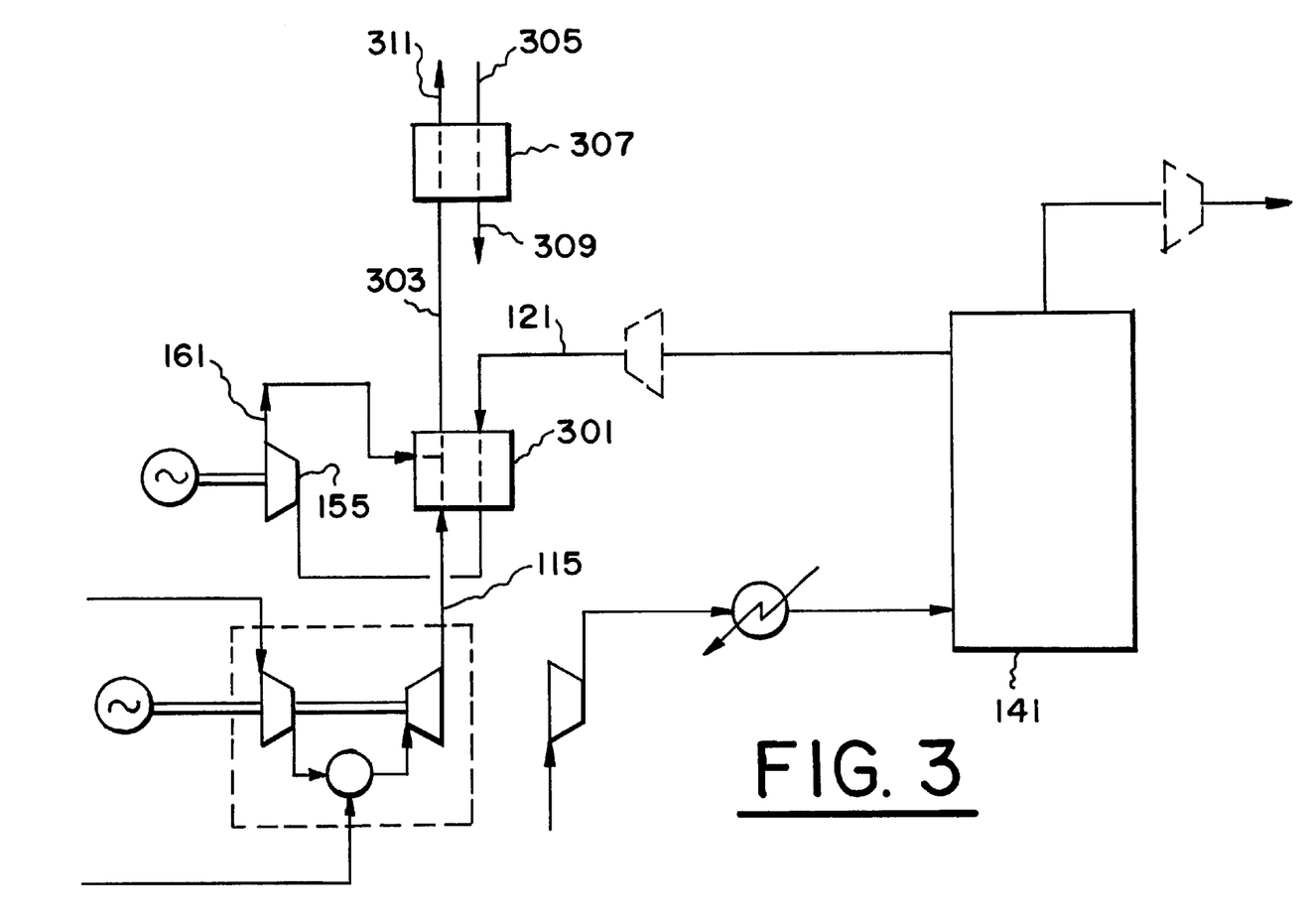
FIG. 3 is a schematic flow diagram of a third embodiment of the process of the present invention wherein the work expanded nitrogen-enriched stream is combined with partially-cooled expansion turbine exhaust in the heat exchanger which heats the nitrogen-enriched stream prior to work expansion.

An alternative embodiment of the invention is shown in FIG. 3. In this embodiment, expanded nitrogen stream 161 from expansion turbine 155 is combined with exhaust stream 115 at an intermediate point within heat exchanger 301 which heats pressurized nitrogen stream 121 upstream of expansion turbine 155. This supplements the heating of pressurized nitrogen stream 121 by recovering additional heat from expanded nitrogen stream 161. Typically, expanded nitrogen stream 161 is combined with exhaust stream 115 at a point within heat exchanger 301 such that the temperatures of the two streams are equal or nearly equal. The combined nitrogen and gas turbine exhaust stream 303 can be further cooled in heat exchanger 307 to heat process stream 305. Heated process stream 309 can be used elsewhere in the process, for example, for TSA regeneration within air separation unit 141 as earlier described, or can be used elsewhere outside of the process. Alternatively, expanded nitrogen stream 161 can be combined with exhaust stream 115 between heat exchangers 301 and 307. Final cooled combined nitrogen and gas turbine exhaust stream 311 is discharged to the atmosphere.

Figure 4:
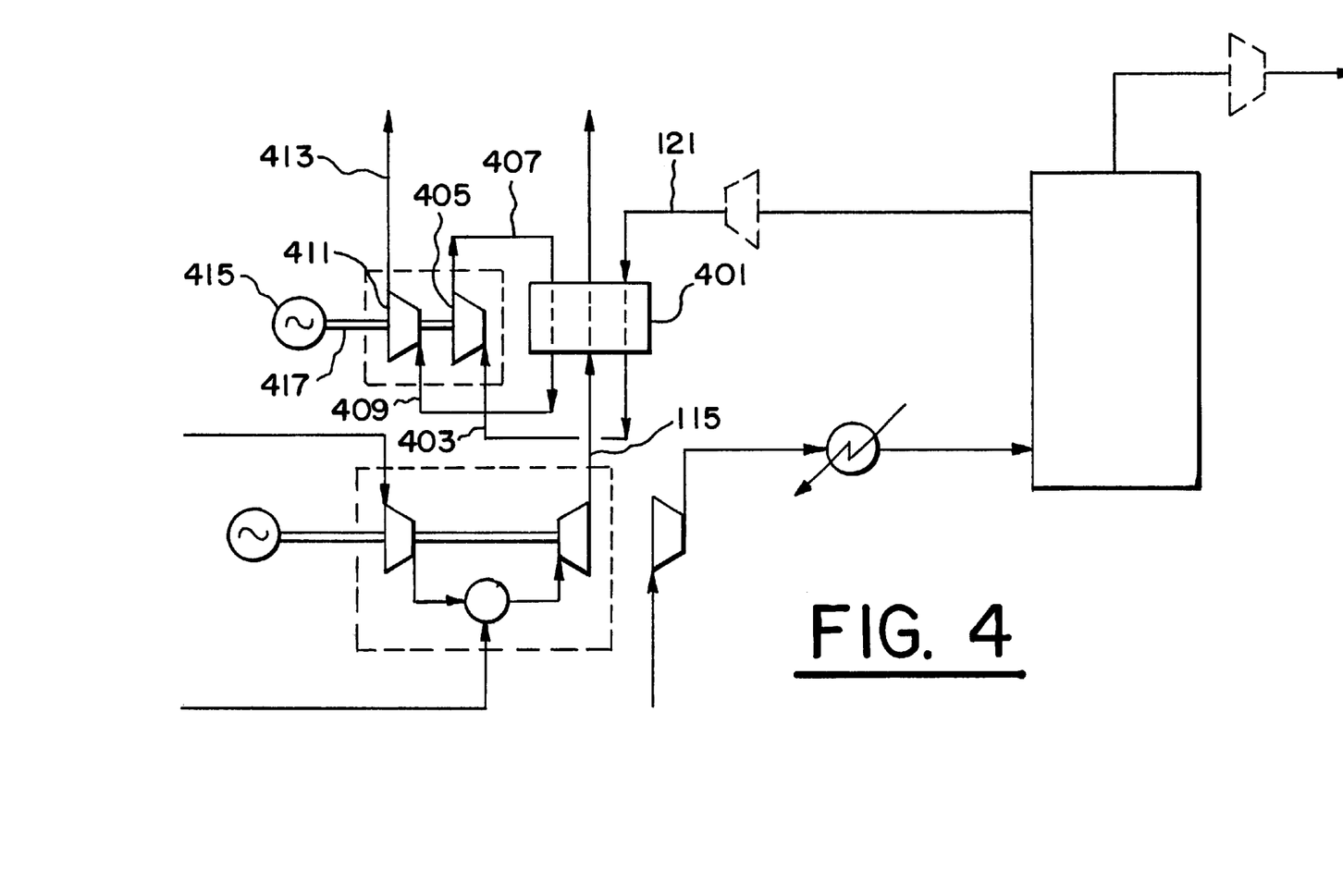
FIG. 4 is a schematic flow diagram of a fourth embodiment of the process of the present invention wherein the exhaust from the nitrogen expansion turbine is reheated and expanded in another expansion turbine.

An alternative embodiment of the invention is illustrated in FIG. 4. In this embodiment, heat energy can be recovered from gas turbine exhaust stream 115 more effectively when the mass flow rate of gas turbine exhaust stream 115 is greater than that of pressurized nitrogen stream 121. Reheat is used to balance the exchange of heat between these two streams wherein pressurized nitrogen stream 121 is heated in heat exchanger 401 to yield intermediate heated nitrogen stream 403, which is work expanded in expansion turbine or turbine stage 405 to yield intermediate expanded nitrogen stream 607. This stream is reheated in heat exchanger 401, and reheated nitrogen stream 409 is work expanded to atmospheric pressure in expansion turbine or turbine stage 411 to yield expanded nitrogen stream 413. Shaft work generated by turbine stages 405 and 411 may be used to drive electric generator 415 by shaft 417, or alternatively to drive other rotating machinery within the process.

In all embodiments of the invention described above, compressor 133, which provides compressed feed air to air separation unit 141, is independently driven. This means that the driver (not shown) would be independent of and have no process integration with combustion engine 129 and product gas streams from air separation unit 141 which have been heated by exhaust from combustion engine 129. This allows air separation unit 141 to supply oxygen-enriched product gas 145 independently of any time-variant demand for electric power from generator 125. Thus expansion turbines 113 and 155 preferably do not provide shaft work for feed gas compressor 133. These process features, if used, decouple feed gas compressor 133 from combustion engine 129, which defines compressor 133 as an independently-driven feed gas compressor. However, compressor 133 could be driven by combustion engine 129 if desired, but in such a case the air separation unit would not necessarily operate independently and could be affected by changes in the demand for electric power from generator 125.

Recovering work from exhaust stream 115 in the embodiments described above is accomplished in the present invention by an alternative to the usual heat recovery steam generation system and steam bottoming cycle earlier described. By recovering heat using a product gas stream from the air separation unit, the required process equipment is significantly reduced by eliminating the heat recovery steam generator (boiler); the boiler feedwater pump and system; the steam expansion turbine; the condenser, condensate pumps, and related equipment; and the boiler feed water demineralization system. The heat exchanger system of the present invention is more compact than a heat recovery steam generator. In addition, for most applications the product gas stream from the air separation system is dry and particle-free, and this is beneficial in the operation and maintenance of the heat exchangers and expansion turbine. Because the invention efficiently utilizes pressurized product gas, a high pressure air separation unit which uses a pumped liquid or elevated pressure cycle can be utilized. These cycles generally require smaller and less expensive equipment than other cycles, and this can be a capital cost advantage. In the present invention, there is no need to balance electric power requirements and product gas requirements, since the air separation unit operates independently of the gas turbine combustion engine which drives the electric generator.

In the embodiments of the invention described above, the air separation unit preferably is a cryogenic separation system which separates the feed gas by cryogenic distillation. The feature of the invention also can be realized in principle when other types of known gas separation processes are used, for example processes which utilize adsorption, membrane permeation, or chemical separation methods.

EXAMPLE

An elevated pressure air separation system is integrated with a gas turbine combustion engine/electric generator set using exhaust heat recovery and a nitrogen expansion turbine which also drives an electric generator. This system is shown in FIG. 1. The air separation system produces 2,000 short tons per day of oxygen product containing 95 vol% oxygen at 614.7 psia. The electric generators produce 10,219 kW (net) of electric power. The system operates at a barometric pressure of 14.7 psia, an ambient air temperature of 59° F., relative humidity of 60%, and a cooling water temperature of 70° F. The gas turbine combustion engine is a typical industrial aeroderivative two-shaft unit with a single spool gas generator and a separate power turbine to drive the electric generator.

A heat and material balance was carried out to illustrate the embodiment of the invention shown in FIG. 1. A stream summary for this balance is given in Table 1.

TABLE 1

Stream Summary for Example (FIG. 1)

| Stream Number | 101 | 109 | 115 | 123 | 131 | 135 |
|---|---|---|---|---|---|---|
| Pressure, psia | 14.55 | 409 | 15.06 | 14.7 | 14.55 | 221 |
| Temperature deg F | 59 | 77 | 950 | 271 | 59 | 178 |
| Flow rate, lbs/hr | 658800 | 11901 | 670701 | 670701 | 751119 | 746719 |
| Composition, Vol % | | | | | | |

TABLE 1-continued

Stream Summary for Example (FIG. 1)

|  |  |  |  |  |  |  |
|---|---|---|---|---|---|---|
| Dry Air | 98.99 | 0.00 | 0.00 | 0.00 | 98.99 | 99.62 |
| Water | 1.01 | 0.00 | 7.27 | 7.27 | 1.01 | 0.38 |
| Nitrogen | 0.00 | 0.00 | 74.87 | 74.87 | 0.00 | 0.00 |
| Oxygen | 0.00 | 0.00 | 13.79 | 13.79 | 0.00 | 0.00 |
| Argon | 0.00 | 0.00 | 0.89 | 0.00 | 0.00 | 0.00 |
| Carbon Dioxide | 0.00 | 0.00 | 3.18 | 3.18 | 0.00 | 0.00 |
| Methane | 0.00 | 100.00 | 0.00 | 0.00 | 0.00 | 0.00 |

| Stream Number | 139 | 143 | 145 | 149 | 153 | 161 |
|---|---|---|---|---|---|---|
| Pressure, psia | 219 | 66 | 66.7 | 614.7 | 64.5 | 14.7 |
| Temperature deg F | 80 | 80 | 80 | 175 | 910 | 508 |
| Flow rate, lbs/hr | 746033 | 565555 | 177068 | 176539 | 565555 | 565555 |

Composition, Vol %

|  |  |  |  |  |  |  |
|---|---|---|---|---|---|---|
| Dry Air | 99.77 | 0.00 | 0.00 | 0.00 | 0.00 | 0.00 |
| Water | 0.23 | 0.33 | 0.00 | 0.00 | 0.33 | 0.33 |
| Nitrogen | 0.00 | 98.62 | 1.66 | 1.66 | 98.62 | 98.62 |
| Oxygen | 0.00 | 0.74 | 95.00 | 95.00 | 0.74 | 0.74 |
| Argon | 0.00 | 0.27 | 3.34 | 3.34 | 0.27 | 0.27 |
| Carbon Dioxide | 0.00 | 0.05 | 0.00 | 0.00 | 0.05 | 0.05 |
| Methane | 0.00 | 0.00 | 0.00 | 0.00 | 0.00 | 0.00 |

A power balance for the rotating equipment is given in Table 2.

TABLE 2

Power Balance for Example

| Equipment Item | Number (FIG. 1) | Shaft Power, kW | Motor Terminal Input Power kW | Generator Terminal Output Power kW |
|---|---|---|---|---|
| Main Air Compressor | 131 | 28457 | 28891 |  |
| Oxygen Compressor | 147 | 5807 | 5923 |  |
| Gas Turbine Engine and Generator | 129 & 125 |  |  | 28500 |
| Nitrogen Expansion Turbine & Generator | 155 & 157 | 12586 |  | 16533 |
| NET EXPORT POWER: | 10219 kW |  |  |  |

NOTES:
1) Compressor seal losses have been accounted for in the balance.
2) Air separation unit losses have been accounted for in the balance.
3) Power for utilities such as coolant circulation pumps, cooling tower fans, lubrication system auxiliaries are not included.

Thus the process of the present invention offers an alternative method for recovering heat from the exhaust gas of a combustion engine integrated with an air separation unit in which the combustion engine drives an electric generator and a gas stream from the air separation unit is heated against the combustion engine exhaust and work expanded to produce additional electric power or drive process equipment. The invention offers an alternative to the well-known method of recovering heat from the combustion engine exhaust by a heat recovery steam generator system, and is useful for process situations in which such a system not appropriate or cost effective.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A method for the generation of electric power and the separation of a feed gas mixture containing oxygen and nitrogen which comprises:
    (a) combusting an oxidant gas and fuel in a combustion engine to generate shaft work and a hot exhaust gas;
    (b) utilizing the shaft work of (a) to drive an electric generator to provide the electric power;
    (c) compressing the feed gas mixture and separating the resulting compressed feed gas mixture into two or more product gas streams with differing compositions, and
    (d) heating at least one of the product gas streams by indirect heat exchange with at least a portion of the hot exhaust gas from the combustion engine of (a) and work expanding the resulting heated product gas stream to generate shaft work and yield an expanded product gas stream.

2. The method of claim 1 wherein the combustion engine is a gas turbine combustion engine.

3. The method of claim 1 wherein the combustion engine is an internal combustion engine.

4. The method of claim 1 wherein shaft work obtained by work expanding the resulting heated product gas stream is utilized to generate additional electric power.

5. The method of claim 1 wherein the feed gas mixture is air, one of the product gas streams is an oxygen-enriched product gas stream, and another of the product gas streams is a nitrogen-enriched product gas stream.

6. The method of claim 5 wherein the air is separated by compressing and cooling air to yield a pressurized air feed stream, purifying the pressurized air feed stream by removing water and carbon dioxide therefrom, further cooling the resulting purified air feed stream, and separating the resulting cooled purified air feed stream by cryogenic distillation to yield the oxygen-enriched product gas stream and the nitrogen-enriched product gas stream.

7. The method of claim 5 wherein the nitrogen-enriched product gas stream is heated by indirect heat exchange with the hot exhaust gas from the combustion engine and the resulting heated nitrogen-enriched product gas stream is work expanded to generate shaft work and yield an expanded nitrogen-enriched product gas stream.

8. The method of claim 7 wherein at least a portion of the shaft work obtained by work expanding the resulting heated nitrogen-enriched product gas stream is utilized to compress the oxygen-enriched product gas stream.

9. The method of claim 7 wherein the expanded nitrogen-enriched product gas stream is cooled by indirect heat exchange with a process gas stream to yield a heated process gas stream.

10. The method of claim 9 wherein the air is separated by compressing and cooling air to yield a pressurized air feed stream, purifying the pressurized air feed stream by a cyclic thermal swing adsorption process to remove water and carbon dioxide therefrom, further cooling the resulting purified air feed stream, and separating the resulting cooled purified air feed stream by cryogenic distillation to yield the oxygen-enriched product gas stream and the nitrogen-enriched product gas stream, wherein the heated process gas stream is used as a regeneration gas in the cyclic thermal swing adsorption process.

11. The method of claim 5 wherein the nitrogen-enriched product gas stream is heated by indirect heat exchange with the hot exhaust gas from the combustion engine in a heat exchanger, and wherein the heating is supplemented by combining the expanded nitrogen-enriched product gas stream with the hot exhaust gas at an intermediate point in the heat exchanger.

12. The method of claim 11 wherein a combined stream of expanded nitrogen-enriched product gas and cooled exhaust gas is withdrawn from the heat exchanger and further cooled by indirect heat exchange with a process gas to yield a heated process gas stream.

13. The method of claim 1 which further comprises:

(e) reheating the expanded product gas stream of (d) by indirect heat exchange with the hot exhaust gas from the combustion engine and work expanding the resulting reheated gas to yield shaft work and a final reduced pressure product gas.

14. The method of claim 13 wherein the combined shaft work of (d) and (e) is utilized to generate additional electric power.

15. The method of claim 1 wherein the compressing of the feed gas mixture in (c) is effected by an independently-driven a feed gas compressor.

16. The method of claim 1 wherein the feed gas mixture is air and one of the product gas streams is an argon-enriched stream.

17. The method of claim 5 wherein the nitrogen-enriched product gas stream is heated by indirect heat exchange with the hot exhaust gas from the combustion engine in a heat exchanger, the resulting cooled exhaust gas is combined with the expanded nitrogen-enriched product gas stream, and the resulting combined gas stream is further cooled by indirect heat exchange with a process gas to yield a heated process gas stream.

* * * * *